April 23, 1935. J. J. GERONDALE 1,999,005
DECORATIVE APPARATUS
Filed April 24, 1934   3 Sheets—Sheet 2

Inventor

J. J. Gerondale

By Clarence A. O'Brien
Attorney

April 23, 1935.   J. J. GERONDALE   1,999,005
DECORATIVE APPARATUS
Filed April 24, 1934   3 Sheets-Sheet 3
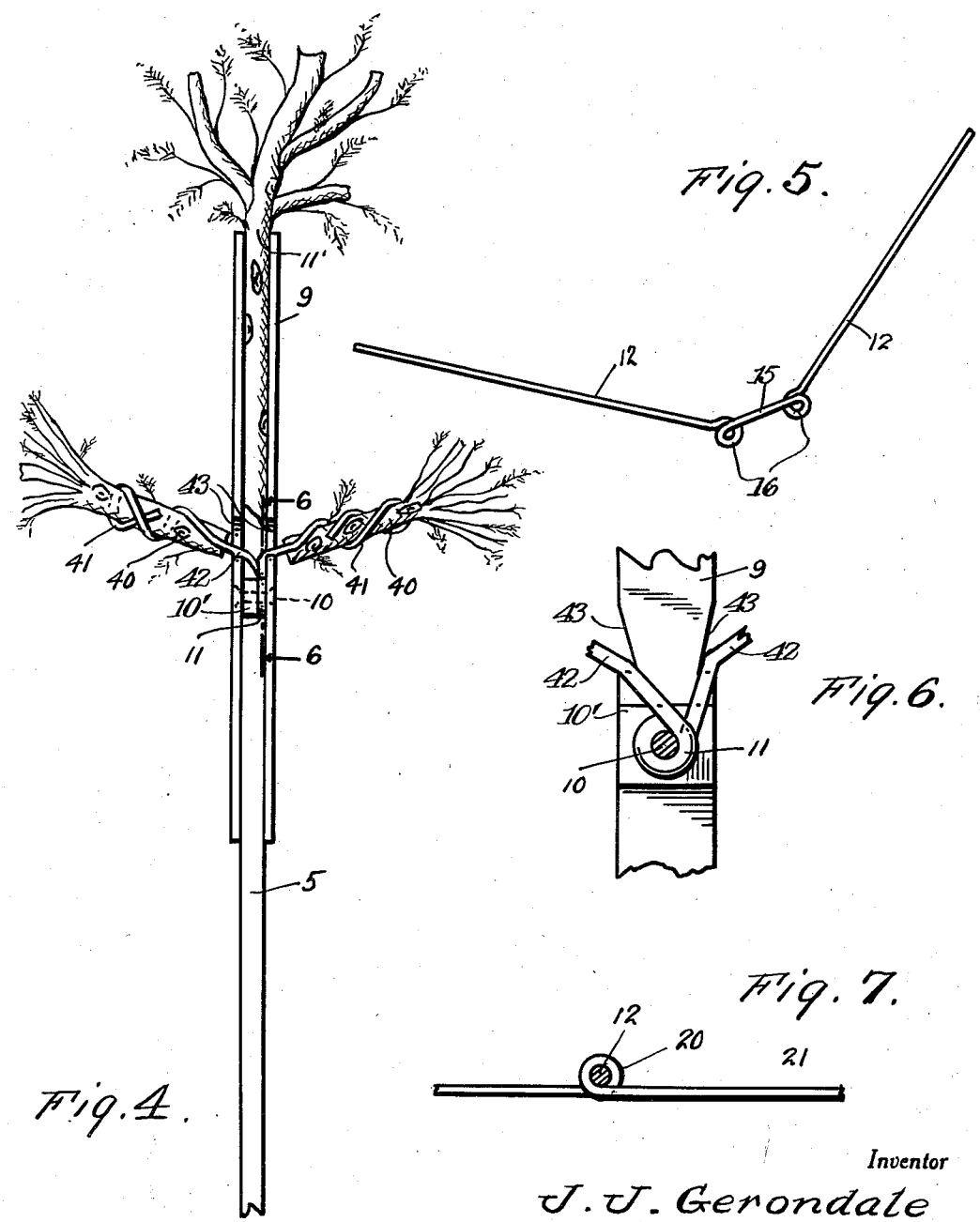
Inventor
J. J. Gerondale
By Clarence A. O'Brien
Attorney Patented Apr. 23, 1935

1,999,005

UNITED STATES PATENT OFFICE 1,999,005

DECORATIVE APPARATUS

John J. Gerondale, Stephenson, Mich.

Application April 24, 1934, Serial No. 722,158

3 Claims. (Cl. 41—15)

The present invention relates to a decorative apparatus having for its prime object to simulate a natural Christmas tree.

Another important object of the invention resides in the provision of means whereby a Christmas tree may be designed with regularity of symmetry in an artistic and attractive manner.

A further important object of the invention resides in the provision of an apparatus of this nature which is comparatively simple in its construction, inexpensive to construct, easy to assemble and disassemble, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 4 is an enlarged detail view through the upper end of the apparatus.

Figure 5 is a perspective view of one of the main stays of one of the frames.

Figure 6 is a detail section taken substantially on the line 6—6 of Figure 4.

Figure 7 is a detail sectional view taken substantially on the line 7—7 of Figure 2.

Figure 1:
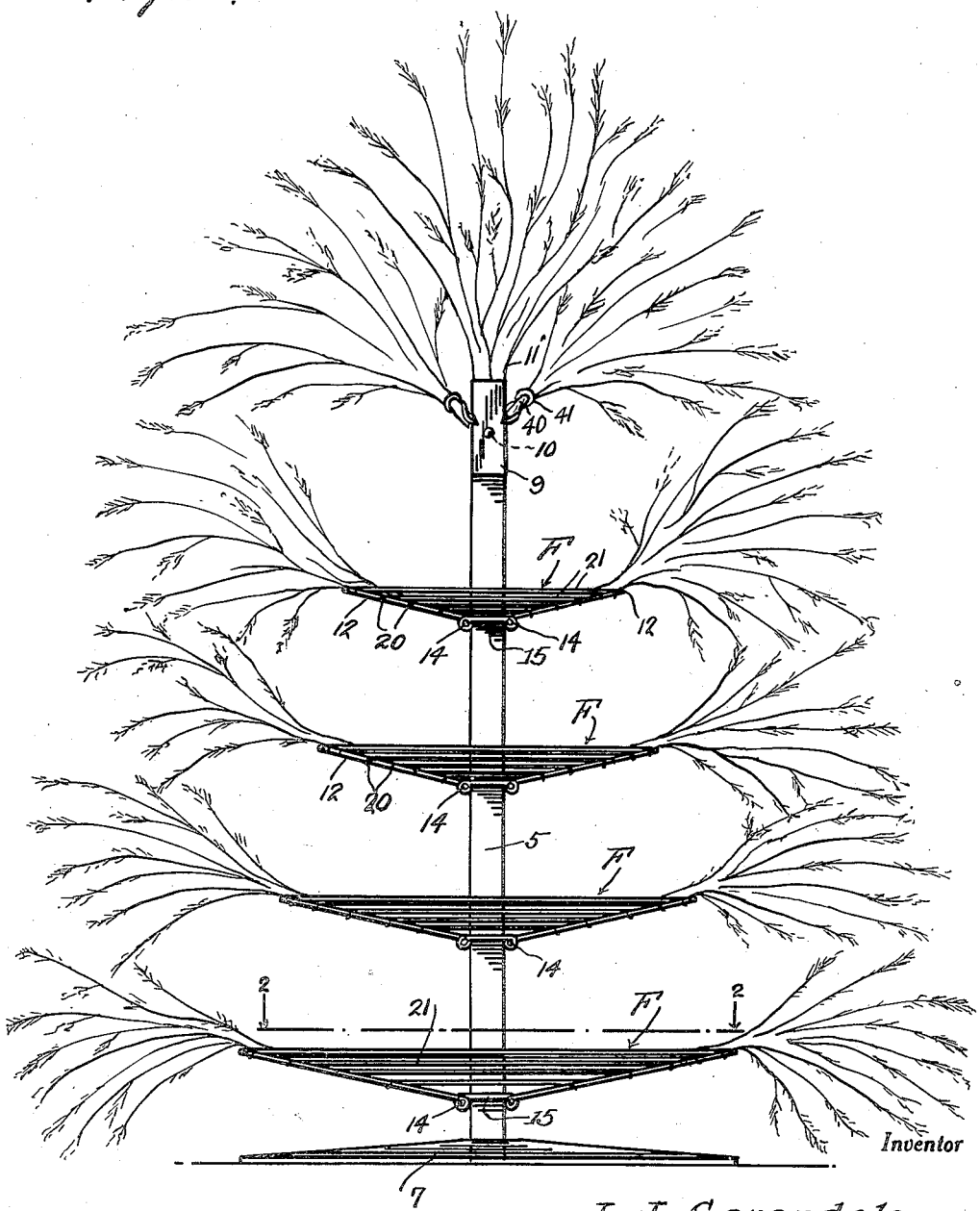
Figure 1 is a side elevation of the apparatus embodying the features of my invention.
Figure 2:
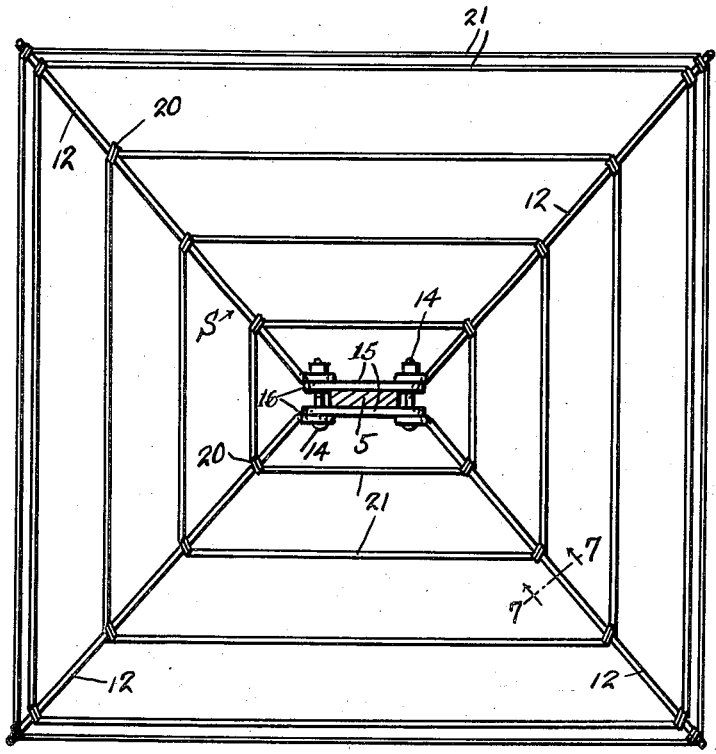
Figure 2 is a horizontal section taken substantially on the line 2—2 of Figure 1.
Figure 3:
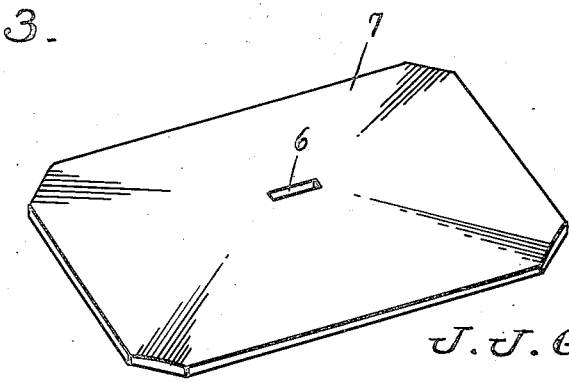
Figure 3 is a perspective view of the base.

Referring to the drawing in detail it will be seen that the numeral 5 denotes a post and the lower end thereof extends through a slot 6 in the central portion of a substantially rectilinear like base plate 7. At the upper end of the post 5 there is secured thereto a pair of flat bars 9 which are clamped to the post by a bolt 10 which passes through the washer 10', said washer abutting the top of the post. The upper parts of the bars extend above the post for receiving a portion 11' of a tree in the manner best illustrated in Figure 4.

A plurality of frames F are arranged on the post 5 and a description of one will be sufficient for all. Each frame F comprises a pair of main stays S. Each main stay S comprises a cross portion 15 merging into convolutes forming eyes 16 and merging into a pair of coplanar outwardly diverging arms 12. The eyes 16 are secured to the post 5 by bolts 14 and the arms 12 incline upwardly and outwardly as shown to advantage in Figure 1.

Wires 21 are arranged in formation and at the corners have convolutes 20 about the arms 12. The wires are in spaced relationship. The frames F in area decrease in uniformity upwardly as shown in Figure 1 and support branches of the tree.

The upper end of the tree is formed by the bars 9 and tree element 11', heretofore referred to. Tree elements 40 are engaged in the coils 41 of rods or wires 42 which extend through notches 43 in the bars 9 and engaged with the bolt 10, as shown at 11.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising an upright, a pair of bars vertically arranged and having the lower part engaging opposite sides of the upright, and means for forcing the bars together to cause their lower parts to clamp the top part of the upright and their upper portions to clamp a tree element, such means including a bolt passing through the bars adjacent the top of the upright, said bars having notches therein above the bolt and a wire having a portion coiled around the bolt and other portions passing through the notches with the extremities of the wire adapted to be twisted around tree elements.

2. An artificial Christmas tree comprising an upright, a pair of bars vertically arranged and having the lower part engaging opposite sides of the upright, and means for forcing the bars together to cause their lower parts to clamp the top part of the upright and their upper portions to clamp a tree element, said bars having notches therein for forming shoulders above the bolt and a wire having a portion coiled around the bolt and other portions passing through the notches with the extremities of the wire adapted to be twisted around tree elements, frames connected in spaced relation with the upright and wires carried by the frame for supporting tree elements from said frames.

3. An artificial Christmas tree comprising an upright, a plurality of vertically spaced frames connected with the upright, each frame including a pair of members each having a straight horizontal arranged central portion, means for clamping said central portions with the upright with said central portions engaging opposite sides of the upright, each member also including outwardly diverging arms having their inner ends connected to the ends of each straight portion, the arms extending upwardly, wires connected with the four arms for holding tree elements.

JOHN J. GERONDALE.